United States Patent [19]

Railsback

[11] Patent Number: 4,661,086
[45] Date of Patent: Apr. 28, 1987

[54] TRANSMISSION

[76] Inventor: Craig R. Railsback, 6014 Acacia Ave., Whittier, Calif. 90601

[21] Appl. No.: 667,855

[22] Filed: Nov. 2, 1984

[51] Int. Cl.$^4$ ............................ F16H 7/02; F16H 9/24
[52] U.S. Cl. .......................................... 474/84; 474/88
[58] Field of Search ........................ 474/69, 70, 72, 73, 474/11, 12, 84, 88; 74/740, 606 R, 325

[56] References Cited

U.S. PATENT DOCUMENTS

| | | | |
|---|---|---|---|
| 3,059,493 | 10/1962 | Wolfram | 474/70 |
| 3,148,556 | 9/1964 | Gibbs et al. | 74/325 |
| 3,529,483 | 9/1970 | Warnock | 474/69 |
| 3,813,956 | 6/1974 | Whitecar | 474/88 |

FOREIGN PATENT DOCUMENTS 635801  3/1962  Italy ...................... 474/84

Primary Examiner—James A. Leppink
Assistant Examiner—Thuy M. Bui
Attorney, Agent, or Firm—Robert R. Thornton

[57] ABSTRACT

A transmission particularly adapted for use in ultralight aircraft, air boats, home built aircraft or the like has a transmission case within which four gears are contained to provide the requisite speed reduction. A torque input gear is coaxially mounted with an output gear so that the transmission torque input shaft is in axial alignment with the transmission output shaft. A pair of intermediate speed reduction gears are laterally offset from the input and output gears and are mounted on a common jackshaft. One of the intermediate gears is belt driven by the input gear and the other intermediate gear belt drives the output gear to provide the requisite speed reduction. The gears and drive belts are toothed. The use of toothed drive belts and gears provide for positive drive of the transmission components. There is no direct physical contact between the input gear and the intermediate gears or between the intermediate gears and the output gear, so as to provide physical isolation between the input and output gears. The coaxial mounting of the input and output gears and the isolation of the intermediate gears from direct contact with the input and output gears by the drivebelts, which are slightly elastic, provides for the required structural strength and rigidity for transmission of torque effect forces from the propeller through the transmission to the engine and the airframe without excessive structural weight of the transmission otherwise required to provide the necessary component strength.

4 Claims, 4 Drawing Figures

TRANSMISSION

BACKGROUND OF THE INVENTION a. Field of the Invention

This invention relates to transmissions, particularly those adapted for use in ultralight aircraft, air boats and homebuilt aircraft, which provide a reduction between the propulsion source output shaft rotation rate and the propeller rotation rate.

b. Brief Description of the Prior Art

In many applications, such as ultralight aircraft which use internal combustion engines, the engine rotation rate is greater, in normal operation, than the desired rotation rate for the driven load, such as the propeller of the aircraft. In ultralight aircraft, the propeller generally rotates at a relatively slow speed and is of comparatively great length. Therefore, in conventional practice, direct drive gear reduction transmissions have been utilized to reduce the propeller rotation rate to about one half of the engine revolution speed. Such transmissions conventionally have two gears, a drive gear which is driven directly by the internal combustion engine output shaft, and an output gear, which is driven by the drive gear. In such an application, the output gear is laterally offset from the drive gear and is axially aligned with the axis of rotation of the propeller. Thus, the propeller axis of rotation is offset from the axis of rotation of the power source drive shaft.

Transmissions of the conventional type, such as that described, have several disadvantages when utilized in ultralight aircraft. As is obvious, the transmission must be of extremely light weight in order to be commercially practical. Thus, the gears are generally of comparatively lightweight construction. The principal problem which is encountered in such transmissions is a result of the condition known as "torque effect", which is exhibited by an airframe in response to the rotation of the aircraft propeller. Torque effect is described, for example, at pages 33 and 34 of "Flight Training Handbook", revised 1980, published by the United States Department of Transportation, Federal Aviation Administration.

The two principal factors in torque effect of concern in ultralight aircraft are the "gyroscopic precession" effect and the "P-factor" effect. In the gyroscopic precession effect, the rotation of the propeller causes a force to be transmitted through the transmission, the engine, and the engine mounts, to the airframe to cause the aircraft to tend to yaw. In the event that the propeller axis of rotation is not aligned with the axis of rotation of the power source drive shaft, the gyroscopic precession effect exerts an additional force on the gears and transmission case which necessitates additional structural rigidity in order to transmit the force through the transmission to the engine without component failure.

The P-factor effect presents a different problem. By reason of the normal use of a two bladed propeller in ultralight aircraft, the P-factor results in a bending moment being imposed upon the transmission components and cover, which varies from zero to a maximum twice during each propeller revolution. The bending moment may result in failure of the gear teeth, the drive shafts, or the transmission case during operation in the conventional type of transmission, which uses direct drive between the gears and an offset axis of rotation of the propeller with respect the drive shaft. In order to avoid such failure, additional structural rigidity, by way of mass for the transmission components, must be provided, thereby increasing the weight of the transmission and thus the aircraft itself.

SUMMARY OF THE INVENTION

A transmission, according to the present invention, particularly adapted to use with ultralight aircraft, includes a torque input gear disposed within a transmission case and an external power source driveshaft fixed to the input gear. An output shaft extends from the transmission case and is axially aligned with the driveshaft. An output gear is mounted on said output shaft within the case and has an annular recess which receives a flange formed on said input gear. Bearing means mounted between the output shaft and the input gear provides for the coaxial engagement of the input gear and output gear, and so the output shaft and driveshaft, while permitting independent rotation of the driveshaft and input gear with respect to the output shaft and output gear. A pair of intermediate gears are disposed within the case so as to be laterally offset from the input gear and output gear, respectively, and are fixed together so that the intermediate gears rotate in unison. Two toothed drive belts, respectively engage gear teeth of said input gear and said first intermediate gear, and gear teeth of the second intermediate gear and the output gear, whereby rotation of the input gear rotates the intermediate gears and the output gear, thereby rotating the output shaft coaxially with the driveshaft, the relative speeds of rotation being determined by the relative gear ratios.

BRIEF DESCRIPTION OF THE DRAWING

The invention may be more readily understood by referring to the accompanying drawing in which.

DESCRIPTION OF THE PREFERRED EMBODIMENT

Figure 1:
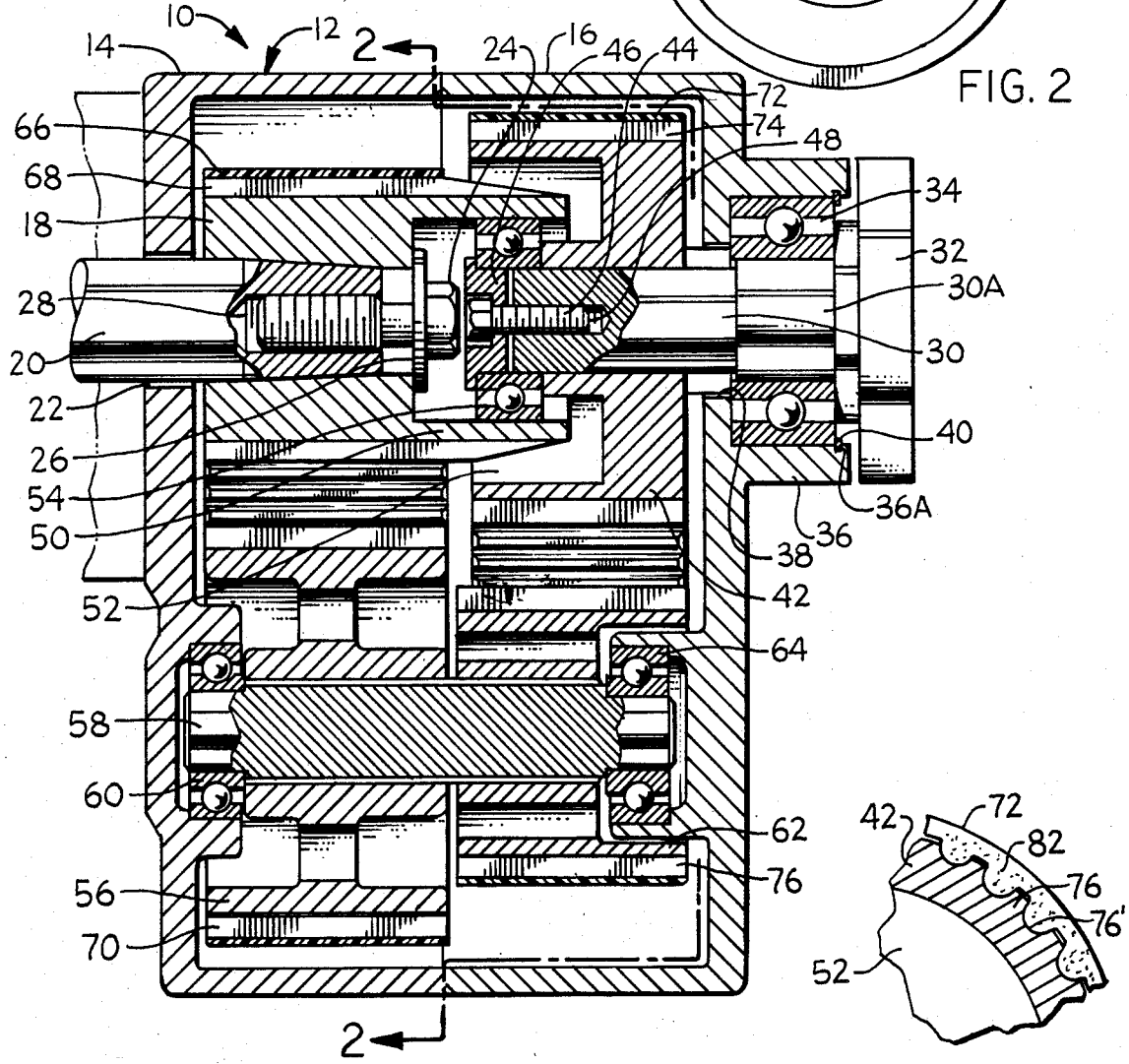
FIG. 1 is a side elevation, in section, of a transmission according to the present invention.

Referring now to FIG. 1, there is shown, in section, a transmission 10 according to the present invention. The transmission 10 has a transmission case 12, comprised of first and second transmission case members 14, 16, respectively, which are bolted together by bolt means, not shown. Disposed within the transmission case 12 is a torque input gear 18. The torque input gear 18 is mounted on a driveshaft 20 which extends through an aperture 22 formed in the first member 14 of the case 12. The driveshaft 20 may be attached to any source of torque. In the preferred embodiment of utilization of the transmission 10 of the present invention, the torque source is a lightweight two stroke cycle internal combustion engine.

The input gear 18 is attached to the driveshaft 20 by a bolt 24 and washer 26, the bolt being threaded into a threaded recess 28 formed in the driveshaft 20.

An output shaft 30 extends through the transmission case member 16 and terminates in a hub 32, which is utilized to attach the work to be rotated, such as a propeller, to the output shaft 30 by conventional means, such as bolts, not shown. The output shaft 30 is fixed in position with respect to the second transmission member 16 by an output shaft bearing 34, of the double race ball type. The bearing 34 is disposed between a shoulder 30 A and the output shaft 30 and a circular flange 36 formed on the transmission case member 16 about an aperture 38, through which the output shaft 30 extends. The bearing 34 is held in the flange 36 by a ring 40 which engages a slot 36 A in the flange 36. An output gear 42 is attached to the output shaft 30 by means of a bolt 44 and cap 46, the bolt being threaded into a threaded recess 48 in the output shaft 30.

A cylindrical flange 50 extends outwardly from the input gear into an annular recess 52 formed in the output gear 42. A single race ball bearing 54 is disposed about the output shaft 30 between the flange 50 and the output gear 42 and cap 46, so as to permit the input gear 18 and output gear 42 to rotate coaxially and freely relative to one another. The bearing 54 also insures that the coaxial alignment of the input shaft 20 and output shaft 30 is maintained, thereby maintaining coaxial alignment of the input gear 18 and output gear 42.

A first intermediate gear 56 is disposed in the case 12 so as to be laterally offset from the input gear 18. The first intermediate gear 56 is mounted on a splined jackshaft 58, which is journalled at one end to the first case member 14 by a single race ball bearing 60. Also mounted on the jackshaft 58 is a second intermediate gear 62, adjacent to which the jackshaft 58 is journalled to the second case member 16 by a single race ball bearing element 64. The second intermediate gear 62 is laterally offset with respect to the output gear 42 and is in axial alignment and rotates in unison with the first intermediate gear 56 by reason their engagement of the splined jackshaft 58.

A first toothed drive belt 66 engages gear teeth 68 formed on the input gear 18 and gear teeth 70 formed on the first intermediate gear 56. A second toothed drive belt 72 engages gear teeth 74 formed on the output gear 42 and gear teeth 76 formed on the second intermediate gear 62. Thus, when the torque source rotates the driveshaft 20, thereby rotating the input gear 18, the drivebelt 66 transmits this rotation to the first intermediate gear 56 which, upon rotating, rotates the jackshaft 58 and so the second intermediate gear 62. Rotation of the second intermediate gear 62 causes rotation of the second drivebelt 72 and thereby rotates the output gear 42 and so the output shaft 30.

Figure 2:
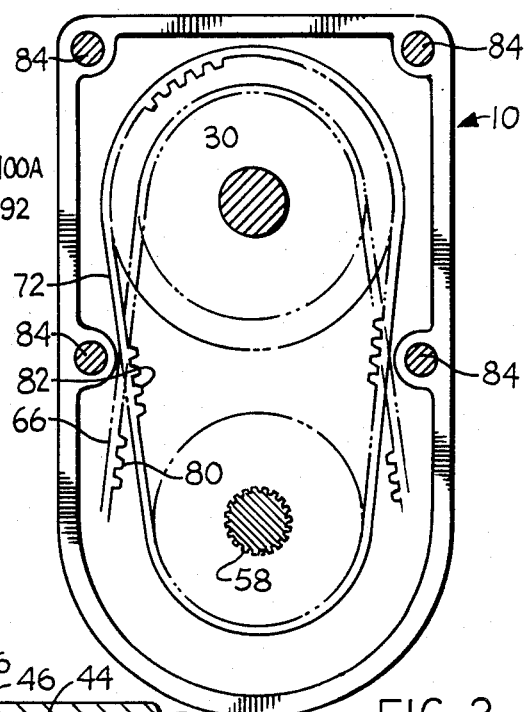
FIG. 2 is an end view, in section, taken along lines 2—2 of FIG. 1.

Referring now to FIG. 2, there is shown a side elevation, partially in section, of the transmission 10. In FIG. 2, the drivebelts 66, 72 are shown. As is seen in FIG. 2, the drivebelt 66 has semicylindrical teeth 80 formed thereon. These teeth 80 engage complementary recesses 68' formed between the teeth 68 of the input gear 18 and complementary recesses 70' formed between the teeth 70 of the first intermediate gear 56. The second drivebelt 72 has similar teeth 82 which engage complementary recesses 76' on the second intermediate gear 62 and 74' on the output gear 42. As is shown in FIG. 1, the case 10 consists of two members 14, 16. In FIG. 2, bolts 84 are utilized to fasten together the two transmission case members 14, 16 to form the unitary structure of the case 10.

Figure 3:
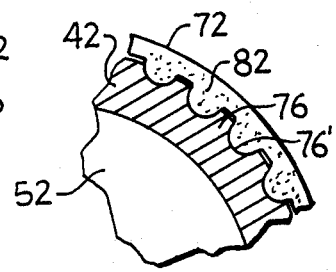
FIG. 3 is a fragmentary sectional view of a portion of the gear and gear drive belt according to the present invention.

Referring now to FIG. 3, the gear teeth 76, complementary recesses 76', and second drivebelt teeth 82 are shown in greater detail. As is shown in the drawing, FIG. 2, drivebelts 66, 72 are utilized. In the presently preferred embodiment, each of these drivebelts is a Uniroyal HTD toothed drivebelt with eight millimeter diameter semi-cylindrical teeth disposed laterally along the inner surface of the belts. These drive belts have a limited elastic characteristic ("partially elastic"), which serves to isolate the engine crankshaft from the propeller, both as to power surges upon engine firing, particularly in a two cycle engine, and destructive reverse cycling of the propeller by reason of the use of a two stroke cycle internal combustion engine.

Conventional transmissions utilize either V-belts or drive chains to transfer the torque from an input gear to intermediate gears if direct gear drive is not utilized. Direct drive is unsatisfactory in transmissions for the present purposes because such direct drives transmit directly the vibrational effects and the two cycle firing effects to the propeller. While V-drive belts assist in isolating the propeller from these undesirable effects, they are subject to slippage, even when poly-V belts are utilized. The drive belts of the present invention provide the advantage of the positive drive of a direct gear drive and the isolation of V-belts.

Figure 4:
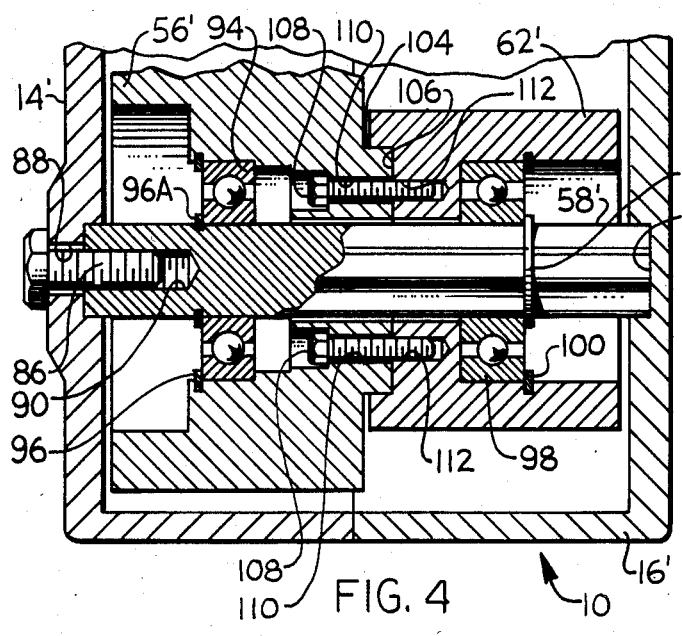
FIG. 4 is a partial sectional view of an alternative embodiment of the invention.

Referring now to FIG. 4, an alternate embodiment of mounting of the intermediate gears and jackshaft is shown. In FIG. 4, a first intermediate gear 56' and a second intermediate gear 62' are rotatively mounted on a jackshaft 58'. The jackshaft is generally fixed as to rotary relative movement with respect to a transmission case 10' by means of a bolt 86 which extends through an aperture 88 in a first transmission case member 14' so as to threadably engage a threaded recess 90 formed in the jackshaft 58'. The jackshaft 58', at the end opposite the threaded recess 90, is seated in a circular recess 92 formed in a second case member 16'. A first intermediate gear ball bearing 94 is disposed about the jackshaft 58' within the first intermediate gear 56' and held in place by a first pair of locking rings 96, 96A, thereby permitting the first intermediate gear 56' to rotate freely about the jackshaft 58'. A second intermediate gear ball bearing 98 is disposed about the jackshaft 58' within the second intermediate gear 62' and held in place by a second pair of locking rings 100, 100A, thereby permitting the second intermediate gear 62' to rotate freely about the jackshaft 58'. The first intermediate gear 56' and second intermediate gear 62' are fixed together by any conventional means, so as to rotate in unison with one another. Alternatively, the first intermediate gear 56 and second intermediate gear 62 can be a unitary structure with either identical or differing diameters for the gears themselves.

In the preferred embodiment shown in FIG. 4, the first intermediate gear 56' and second intermediate gear 62' are connected together by means of an angular shoulder 104 formed on the first intermediate gear 56' which engages a complementary recess 106 formed on the second intermediate gear 62'. The dimensions of the shoulder 104 and recess 106 are such that the two gears can be fixed to each other by shrink fitting the shoulder into the recess. In order to insure that the shrink fit joint maintains the two gears 56', 62' rotating in unison, bolts 108 extend through cylindrical recesses 110 formed in the first intermediate gear 56' so as to engage threaded recesses 112 formed in the second intermediate gear 62'. After shrink fitting, the bolts are tightened so as to strengthen the joint between the intermediate gears 56', 62'.

The invention claimed is:

1. A transmission comprising:

a transmission case;

a torque input gear disposed within said case, said input gear including means for fixing a driveshaft to said gear so as to rotate said gear about the axis of rotation of said driveshaft upon rotation of the driveshaft;

an output shaft disposed within said case and extending out thereof;

first bearing means for mounting said output shaft to said transmission case so that said output shaft is rotatable with respect thereto and axially aligned with the driveshaft;

an output gear mounted on said output shaft within the case so as to be axially aligned with said input gear;

an annular recess formed on said output gear so as to open toward said input gear, said output gear having a greater diameter than said input gear;

a flange formed on said input gear so as to extend into said annular recess, said flange having a cylindrical bore formed therein in axial alignment with said driveshaft;

second bearing means mounted between the output shaft and the input gear within the cylindrical bore so as to permit the input gear and output gear to rotate about the same axis independent of one another;

a first intermediate gear disposed within the case so as to be laterally offset from the input gear;

a second intermediate gear disposed within the case in axial alignment within the first intermediate gear and laterally offset with respect to the output gear;

means connecting the first and second intermediate gears, whereby rotation of the first intermediate gear rotates the second intermediate gear in unison therewith;

bearing means for mounting said intermediate gears in said case so that said gears are freely rotatable therein in unison with one another;

first partially elastic drive belt means engaging the gear teeth of said input gear and said first intermediate gear, whereby rotation of the input gear rotates the intermediate gears; and second partially elastic drive belt means engaging the gear teeth of the second intermediate gear and the output gear, whereby rotation of the second intermediate gear rotates the output gear, thereby rotating the output shaft.

2. The transmission of claim 1, and in which each of said drive belt means is partially elastic and has semi-cylindrical teeth, and in which each of said gears has teeth with semi-cylindrical spacing therebetween, said semi-cylindrical spacings being complementary with said semi-cylindrical belt teeth.

3. The transmission of claims 1 or 2, and in which said bearing means includes a jackshaft to which the intermediate gears are fixed and bearings engaging said jackshaft and said case so that the jackshaft rotates within the case in unison with the intermediate gears.

4. The transmission of claims 1 or 2, and in which said bearing means includes a jackshaft which is fixed to said case and at least one bearing member through which said jackshaft extends and which engages the interiors of the intermediate gears so as to permit the intermediate gears to rotate freely with respect to the jackshaft.

* * * * *